United States Patent Office 3,728,308
Patented Apr. 17, 1973

3,728,308
CATALYST FOR URETHANE REACTION
Ronald D. Allison and Louis G. Rey, Sarnia, Ontario, Canada, and Roy E. Morgan, Jr., Richwood, Tex., assignors to The Dow Chemical Company, Midland, Mich.
No Drawing. Filed Feb. 18, 1971, Ser. No. 116,628
Int. Cl. C08g 22/40
U.S. Cl. 260—77.5 AB                    4 Claims

ABSTRACT OF THE DISCLOSURE

The reaction of an organic polyisocyanate with a polyol to produce a polyurethane is catalyzed by an alkali metal salt of the polyol. Both the polyol and the catalyst should be substantially anhydrous.

BACKGROUND OF THE INVENTION

While bases are known to catalyze the reaction of isocyanates with alcoholic OH groups, alkali metal bases have not been satisfactorily used as such catalysts because they have been found to be uncontrollable in their action, in addition to catalyzing undesired side reactions, such as the polymerization of the isocyanate.

SUMMARY OF THE INVENTION

According to the invention, the urethane reaction, i.e., the reaction of an organic polyisocyanate with a polyol to produce a polyurethane, is catalyzed by an alkali metal salt, i.e., alcoholate, of the polyol. The preferred alkali metals are Li, Na and K.

The polyol used in making the catalyst is any of the known class of polyols useful in making polyurethanes. As a matter of convenience, it is a polyol that is to be used in the polyol side of the urethane-forming formulation, though it need not be the same so long as its presence in the urethane product is not detrimental. Thus, in a preferred mode of operation, the catalytic salt is made in situ in a portion or all of the polyol to be used in making the urethane product. Such salt is readily made by reaction of the alkali metal, or its hydroxide, hydride, or alcoholate with the polyol, followed by removal of the byproduct hydrogen, water or alcohol from the catalyst. This is readily done by devolatilizing the composition, as by heating it to about 100–200° C. under vacuum. It is preferred, especially in the production of rigid urethane foams, that the water content of the polyol formulation going into the urethane reaction contain not more than about 2000 p.p.m. of water, and most preferably less than 500 p.p.m., since higher moisture content results in coarser, less uniform texture and greater friability in the foam.

The amount of catalyst used in making the urethane product can be varied widely, depending on the desired speed of the reaction. Suitable amounts are about 0.1 to 3% by weight, calculated as alkali metal hydroxide, based on the total polyol used to make the polyurethane.

The organic polyisocyanates and the polyols that are useful in practicing the present invention include all those known in the art to be useful in making polyurethane resins. Thus, the isocyanates include the common aromatic isocyanates, such as the phenylene and tolylene diisocyanates methylenediphenyleneisocyanate, polymethylenepolyphenylene isocyanates, and their halo-substituted analogs, and the aliphatic polyisocyanates, such as the alkylenediisocyanates, including, for instance, 1,4-butylene-, 1,6-hexylene- and 1,5-octylenediisocyanates.

The useful polyols include the alkylene glycols and polyoxyalkylene glycols, glycerol, sorbitol, the polyalkanolamines, e.g., triisopropanolamine, etc. A preferred class of polyols are the polyether polyols.

The polyether polyols which may be employed in the present invention are those compounds having at least two hydroxyl groups. They are generally prepared by the catalytic polymerization of an alkylene oxide or a mixture of alkylene oxides, in the presence of an initiator which is an organic compound having at least two active hydrogen atoms. The lower alkylene oxides such as ethylene oxide, propylene oxide and butylene oxide are preferred. Numerous organic compounds having at least two active hydrogen atoms may be employed as initiators. Preferred compounds are polyhydric alcohols such as ethylene glycol, propylene glycol, the isomeric n-butylene glycols, 1,5-pentanediol, 1,6-hexanetriol, glycerol, trimethylolpropane, sorbitol, sucrose, $\alpha$-methyl glucoside and pentaerythritol. Other useful compounds include organic acids such as adipic acid, succinic acid, aconitic acid and trimellitic acid; inorganic acids such as the phosphoric acids, amines such as methylamine, ethylamine, ethylenediamine, diethylenetriamine, toluenediamine, aniline, methylenedianiline, piperazine and triisopropanolamine; phenolic compounds such as bisphenol, pyrogallol, resorcinol, inositol; mercaptans such as 1,2-ethanedithiol and 1,2,3-propanetrithiol, and acid amides such as actamide and benzenesulfonamide. Mixtures of any of the above may also be employed. Particularly preferred polyether polyols are those derived from one or more $C_1$–$C_4$ alkylene oxides, such as ethylene oxide and propylene oxide, and a polyhydric alcohol such as trimethylolpropane, propylene glycol or glycerol, said polyols having molecular weights from about 400 to 30,000.

The preparation of polyurethanes from the polyether polyols of the present invention may follow any of the standard prior art procedures. Thus, the so-called "prepolymer," "quasi prepolymer" or "one-shot" method may be employed. Along with the polyether polyols, an organic polyisocyanate, a catalyst, a surfactant and, if a foam is desired, a blowing agent are generally employed. Various other additives, all well known in the art, may also be employed if desired. The preparation of polyurethane foams and the reactants employed in the preparation are well known in the art as evidenced by U.S. Pats. Nos. 3,072,582; 3,091,551 and 3,112,281, all of the disclosures thereof incorporated herein by reference thereto.

The catalyst of the invention is useful in catalyzing any isocyanate-polyol reaction in which a urethane resin is produced, whether the resin be rigid or flexible and whether it be foamed or not. It is particularly useful, however, in making rigid or semirigid foams, especially where fast reaction and small, uniform cells are desired. Such operations include continuous urethane laminations, spray application of coatings and foam insulation, etc.

SPECIFIC EMBODIMENTS

The practice of the invention is illustrated by the following examples.

EXAMPLE 1

A solution of catalyst in polyol was prepared as follows (all parts are by weight):

A solution of 1.5 parts of KOH in 1.2 parts of water was mixed with 100 parts of a polyether polyol mixture consisting of equal parts of (1) Voranol RS–375 polyol, a commercial polyether polyol made by condensing propylene oxide with sucrose until a hydroxyl number of 375 is reached and (2) Voranol RA–800, a commercial polyol made by reacting ethylenediamine with one molar equivalent of ethylene oxide and three molar equivalents of propylene oxide. The resulting mixtures was then dehydrated by heating it at 150° C. under vacuum until the water content was reduced to 250 p.p.m.

One part of the above catalyst solution was added to two parts of the same mixture of polyols. To 100 parts of the resultant solution was added 0.5 part of Dow Corning DC 193 silicone surfactant and 41 parts of trichlorofluoromethane. This mixture was then reacted at ambient temperature with 142 parts of methylenedi(4-phenylisocyanate) (Mondur MRS). A very rapid but controllable reaction occurred, producing a high quality rigid foam.

When the above experiment was repeated, using NaOH instead of KOH, very similar results were obtained.

EXAMPLE 2

The experiment of Example 1 was repeated except that the solution of KOH in polyol was divided in half, one-half being dehydrated as described while the other half was not dehydrated. Each portion was diluted with polyol and formulated as described. The water content of the two formulations, A and B, was then 300 p.p.m. and 4000 p.p.m., respectively. Each was then reacted with isocyanate as described, the amount of isocyanate used with B being increased to 148 parts because of the higher water content. Results were as follows:

| | A | B |
|---|---|---|
| Cream time, sec | 2 | 13 |
| Rise time, sec | 11 | 50 |
| Foam structure | Small, uniform cells, mildly friable. | Coarse, large voids, friable. |

EXAMPLE 3

A quasi-prepolymer containing 24% NCO was made by adding, at a temperature below 90° C. and with effective agitation, 3 parts by weight of tolylene diisocyanate to 1 part of a polyether triol made by the condensation of propylene oxide with glycerol until the molecular weight of the product reached 260.

A catalyzed polyol was prepared by adding 1% by weight of a 50% aqueous solution of NaOH to polyoxypropylene glycol of molecular weight 2000 and then dehydrating the mixture by heating it at 150° C. under vacuum until the water content was reduced to 200 p.p.m. The product was then diluted with an equal volume of the same glycol, thus producing a polyol containing 0.25% (NaOH basis) of the sodium salt of the polyol.

A solid elastomeric polyurethane was made by combining 18.4 parts of the quasi-prepolymer with 100 parts of the catalyzed polyol. Within 1 hr. the product had cured to a Shore A Hardness of 45, at which time the reaction was essentially complete.

We claim:

1. In process of making a polyurethane resin by the reaction of an organic polyisocyanate with a polyol, the improvement of catalyzing the reaction with a catalytic amount of an alkali metal salt of the polyol, said polyol being substantially free of alcohol and containing not more than about 2000 p.p.m. of water.

2. The process of claim 1 wherein the alkali metal is Na or K.

3. The process of claim 1 wherein the water content is not more than about 500 p.p.m.

4. The process of claim 1 wherein the concentration of the catalyst, calculated as alkali metal hydroxide, is about 0.1 to 3% by weight, based on the total polyol.

References Cited

FOREIGN PATENTS 900,392   7/1962   Great Britain _____ 260—2.5 AB

OTHER REFERENCES

Saunders et al., Polyurethanes, Part II, Interscience, N.Y., 1964, pp. 216 and 217.

DONALD E. CZAJA, Primary Examiner

M. J. WELSH, Assistant Examiner

U.S. Cl. X.R.

252—430; 260—2.5 AB, 75 NB